UNITED STATES PATENT OFFICE.

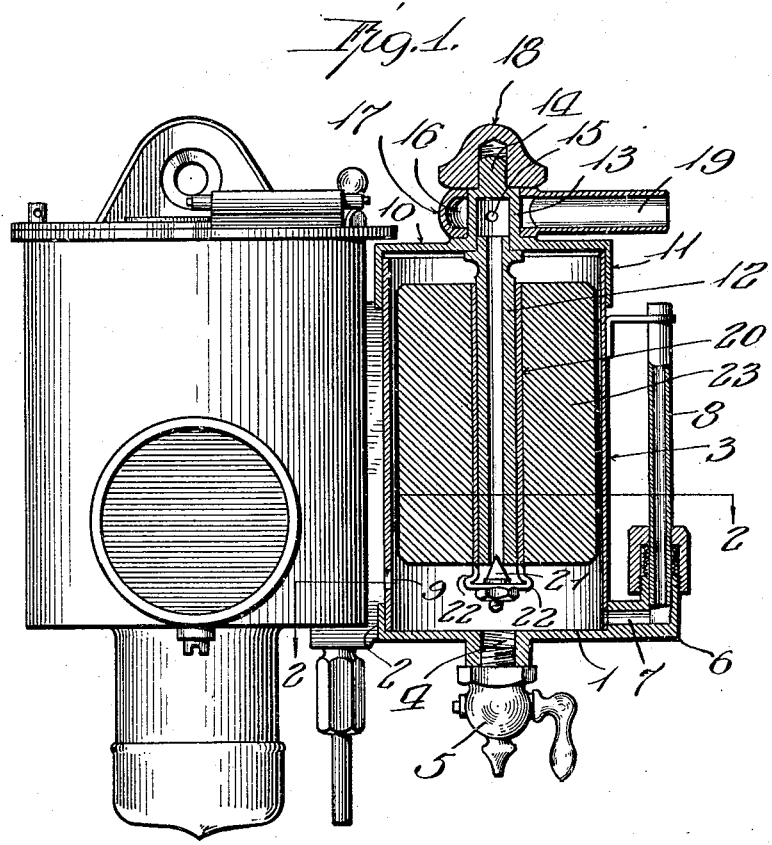

FRANK P. ILLSLEY, OF DETROIT, MICHIGAN.

LIQUID-LEVEL-REGULATING DEVICE.

1,227,539.  Specification of Letters Patent. Patented May 22, 1917.

Application filed November 7, 1914. Serial No. 870,762.

*To all whom it may concern:*

Be it known that I, FRANK P. ILLSLEY, a citizen of the United States, and a resident of Detroit, in the county of Wayne and State of Michigan, have invented certain new and useful Improvements in Liquid-Level-Regulating Devices, of which the following is a specification.

My present invention relates to liquid level regulating devices, and has special reference to the provision of such a device suitable for use in connection with carbureters for internal combustion engines.

The particular objects of my present invention are, first, the provision of such a device which shall have a minimum number of parts, and especially moving parts, which can get out of adjustment or out of order; second, the provision of means in such a device for securing a dependable alinement between the moving parts so that the valve will accurately seat; and, third, the designing of such a device so that sediment or foreign matter may freely gravitate away from the moving parts and leave them free to operate. I attain these divers objects by means of the structure illustrated in the following drawings, in which:—

Figure 1 is an elevation of a carbureter with my present invention embodied therein, the liquid level regulating portion thereof being shown in central section; and Fig. 2 is a transverse or horizontal section through the liquid level regulating portion of the device on line 2—2 of Fig. 1.

Similar reference characters refer to similar parts throughout the respective views.

The device consists essentially of a float chamber, an inlet pipe depending or extending downwardly from the top thereof, a tubular or cylindrical member closely fitting the depending inlet pipe so that the movement thereof is guided by said inlet pipe, a valve mounted in the bottom of said tubular member so as to be guided accurately upon its seat in the lower end of said inlet pipe, there being provided openings in the bottom of said tubular member around the valve for permitting sediment or foreign matter to freely gravitate therefrom, and a float secured rigidly to and about said tubular member, so as to move the tubular member and the valve carried therein in accordance with the level of the liquid in the float chamber.

The float chamber is preferably, but not necessarily of cylindrical form, and, for convenience in manufacture, consists of a bottom, 1, having an upwardly extending peripheral flange, 2, within which fits the cylindrical body portion, 3. The bottom 1, is provided with a centrally located port, 4, into which is screwed a pet cock, 5, to permit of draining the float chamber. And as this port is immediately below the inlet opening and valve, the opening thereof will flush away such sediment or foreign matter as may be thereabout. In addition to the drain port, 4, the bottom, 1, is provided with a lateral bracket, 6, having a duct, 7, therein which communicates with a vertically disposed glass tube, 8, by means of which may be seen whether the float chamber is receiving liquid and the height of the liquid in the chamber.

In the lower part of the body portion, 3, may conveniently be provided a port, 9, through which the liquid flows from the float chamber to the carbureter. The cover 10 may conveniently be provided with a depending peripheral flange, 11, which fits about the upper end of the body portion, 3. Preferably from the center of the cover, 10, depends the inlet pipe, 12, which should be extended substantially to or below the level of the liquid, so that when the valve closes there should be no surplus amount of liquid upon the upper portion of the float or chamber the gravitation of which would disturb the desired level.

Upon the center of the upper or outer face of the top is a boss, 13, the top 14 of which is reduced and threaded. The channel of the inlet pipe, 12, is continued upwardly into the boss, 13, and communicates through lateral ports, 15, with a channel, 16 provided in a ring 17 fitting over said boss and held in place by a nut, 18, screwing upon the reduced threaded portion, 14. The channel, 16, in the ring 17, communicates with a piece of tubing, 19, which may be integral with said ring, and which may be connected with a suitable source of supply.

The inlet pipe, 12, is preferably of angular cross section, as shown in Fig. 2, so as to leave openings or channels 12ª between its outer surface and the inner or tubular member 20, through which sediment or foreign matter may freely gravitate, while the edges of the inlet pipe serve as guides for the movement of the tubular member.

The bottom of the tubular member is suitably bridged across to form a mounting for the valve, 21, and at the same time to provide about the valve, 21, openings, 22, for the escape of sediment or foreign material.

Secured to the outside of the tube 20 is a float, 23, which may be either cork or some other light material or a hollow metal casing as may be desired.

Having described my invention what I claim as new and desire to secure by Letters Patent is:

1. A liquid level regulating device comprising a compartment, an inlet pipe depending from the top thereof, to a point substantially at the desired level of the liquid, a float guided by said inlet pipe, there being provided between said pipe and float a longitudinal channel for the gravitation of sediment, and a valve carried by said float and adapted to extend into and seat in the outlet of said inlet pipe.

2. A liquid level regulating device comprising a compartment, an inlet pipe of angular cross section depending from the top thereof a float guided by said pipe and a valve carried by said float and adapted to seat in the outlet of said inlet pipe.

3. A liquid regulating device comprising a compartment, an inlet pipe depending from the top thereof, a float surrounding and guided by said inlet pipe said float and pipe constructed to provide longitudinal channels therebetween and a valve carried by said float and adapted to seat in the outlet of the inlet pipe.

4. A liquid level regulating device comprising a compartment, an inlet pipe depending from the top thereof, a float surrounding and guided by said inlet pipe and a valve carried by said float and adapted to seat in the outlet of the inlet pipe, said inlet pipe being of angular cross section to provide channels between the outer surface thereof and the said float.

5. A fluid level regulating device comprising a compartment, an inlet pipe depending from the top thereof, a tube telescopically engaging said pipe, there being provided between said tube and pipe longitudinal approximating surfaces and channels therebetween, a valve carried by said tube adapted to seat in the outlet of said inlet pipe, and a float mounted on said tube.

In testimony whereof I have hereunto set my name in the presence of two witnesses.

FRANK P. ILLSLEY.

Witnesses:
WM. HAROLD EICHELMAN,
BENJ. T. ROODHOUSE.

Copies of this patent may be obtained for five cents each, by addressing the "Commissioner of Patents, Washington, D. C."